US008498014B2

(12) United States Patent
Miki et al.

(10) Patent No.: US 8,498,014 B2
(45) Date of Patent: Jul. 30, 2013

(54) IMAGE FORMING METHOD AND IMAGE FORMING APPARATUS WITH DEFECT COMPARISONS AT INTERMEDIATE TRANSFER STAGE

(75) Inventors: Takeo Miki, Machida (JP); Yoshinori Misumi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1550 days.

(21) Appl. No.: 11/700,181

(22) Filed: Jan. 31, 2007

(65) Prior Publication Data

US 2007/0177216 A1 Aug. 2, 2007

(30) Foreign Application Priority Data

Jan. 31, 2006 (JP) ................................. 2006-022869

(51) Int. Cl.

| | |
|---|---|
| ***G06F 15/00*** | (2006.01) |
| ***G06K 1/00*** | (2006.01) |
| ***G06K 15/22*** | (2006.01) |
| ***G03G 15/01*** | (2006.01) |
| ***G03G 15/20*** | (2006.01) |

(52) U.S. Cl.
USPC ............ 358/1.9; 358/1.14; 399/312; 399/302

(58) Field of Classification Search
None
See application file for complete search history.

(56) References Cited

U.S. PATENT DOCUMENTS

| | | | | |
|---|---|---|---|---|
| 2003/0012436 | A1* | 1/2003 | Lyford et al. | 382/167 |
| 2004/0252286 | A1* | 12/2004 | Murray et al. | 355/28 |
| 2006/0114529 | A1* | 6/2006 | Oh | 358/527 |

FOREIGN PATENT DOCUMENTS

| | | |
|---|---|---|
| EP | 0 450 218 A1 | 10/1991 |
| EP | 1 667 425 A1 | 6/2006 |
| JP | 8-179607 | 7/1996 |
| JP | 2002-283598 | 10/2002 |

OTHER PUBLICATIONS

European Search Report dated May 25, 2007 for Appln. No. 07001030.1-1251.

* cited by examiner

*Primary Examiner* — Ming Hon
(74) *Attorney, Agent, or Firm* — Pillsbury Winthrop Shaw Pittman, LLP

(57) ABSTRACT

Two identical images are printed, side by side, on an intermediate transfer-recording medium, by using image data that represents an image to be printed on a brochure. The two images thus printed are compared, thereby to determine whether they have defects. One of the images, which is found to have no defects, is transferred from the intermediate transfer-recording medium to the brochure, which is a final transfer-recording medium.

12 Claims, 6 Drawing Sheets

IMAGE FORMING METHOD AND IMAGE FORMING APPARATUS WITH DEFECT COMPARISONS AT INTERMEDIATE TRANSFER STAGE

CROSS-REFERENCE TO RELATED APPLICATIONS

This application is based upon and claims the benefit of priority from prior Japanese Patent Application No. 2006-022869, filed Jan. 31, 2006, the entire contents of which are incorporated herein by reference.

BACKGROUND OF THE INVENTION

1. Field of the Invention

The present invention relates to an image forming method and an image forming apparatus, both employing an intermediate transfer-recording system. More particularly, the invention relates to an image forming method and an image forming apparatus, which are designed to form high-quality portraits for personal IDs, binary images (e.g., characters) or anti-forging images on media such as cards and brochure pages.

2. Description of the Related Art

Known as such an image forming method is the intermediate transfer-recording method. In this method, a thermal heat transfers ink from an ink ribbon to an intermediate transfer-recording medium, thus forming an image on the medium. This image is transferred from the medium to a final transfer-recording medium such as a card or a brochure page. In the intermediate transfer-recording method, any image is first formed on the intermediate transfer-recording medium having an image-receiving layer, unlike in the method that forms an image directly on the final recording medium. Therefore, the intermediate transfer-recording method can form a stable image, regardless of the condition of the transfer-recording surface of the final recording medium.

In the thermal transfer recording system using a thermal head, dust, for example, may exist between the image-receiving layer of the intermediate transfer-recording medium and the ink ribbon or between the thermal head and the ink ribbon. In this case, some color dots cannot be transferred to the recording medium, inevitably forming an image having no desired color.

After transferred to the final recording medium, such an image is visually examined for defects. If the image has defects that are too prominent, the final recording medium is discarded, and the same image is transferred from the intermediate transfer-recording medium to a new final recording medium such as a card or a brochure page. In recent years, various sophisticated measures have been taken to prevent forgery on the final recording media thus discarded, such as cards and brochure pages. Further, relatively expensive final recording media have come into use in increasing numbers, each incorporating an IC chips, typically a radio IC chip. In view of these facts, the discarding of the cards and brochure pages, because of the above-mentioned defective images, makes a great economic loss.

A technique is known, which may avoid such an economic loss (see, for example, Jpn. Pat. Appln. KOKAI Publication No. 2002-283598). This technique is to compare an image formed on an intermediate transfer-recording medium with the original image represented by image data, before the image transferred to a final recording medium, determining whether the image is defective or not. In accordance with whether the image is defective, it is then determined whether the image should be transferred to the final recording medium.

The technique can prevent an image from being transferred to a final recording medium if the image has been found to be defective. Hence, final recording media will not be wasted, thus avoiding the above-mentioned economic loss.

However, the accuracy of determining whether an image is defective is low. This is because the image formed on an intermediate transfer-recording medium is compared with only the original image represented by image data, and the amount of data used in determining the defectiveness of the image is inevitably too small.

The technique described above uses an inspection algorithm. The algorithm is so described that an image, such as a person's portrait, for example, is inspected in accordance with the contour of the face or the binary-image area thereof. It is therefore difficult to detect defects in the pixels that constitute the image. The algorithm cannot help to accomplish the inspection at a desirable precision.

BRIEF SUMMARY OF THE INVENTION

An object of the present invention is to provide an image forming method and an image forming apparatus, which can reliably inspect an image printed on an intermediate transfer-recording medium, in units of pixels, for any defects that the image may have, and which can avoid discarding of a final recording medium, thus helping to reduce the printing cost.

To achieve the object, an image forming method according to the present invention comprises: a printing step of printing at least two identical images on two regions of an intermediate transfer-recording medium, respectively, by using image data representing an image to be transferred to a final transfer-recording medium; an inspecting step of inspecting the images printed on the intermediate transfer-recording medium in the printing step, by reading and comparing the images, thereby to determine whether the images have defects; and a transferring step of transferring an image found to have no defects in the inspecting step, from the intermediate transfer-recording medium to the final transfer-recording medium.

Another image forming method according to the present invention comprises: a printing step of printing at least two identical images on two regions of an intermediate transfer-recording medium, respectively, by using image data representing an image to be transferred to a final transfer-recording medium; a first inspecting step of inspecting the two images printed on the intermediate transfer-recording medium in the printing step, by reading the images from the intermediate transfer-recording medium and comparing the images, thereby to determine whether the images have defects; a second inspecting step of comparing the images to determine whether the images have defects, by comparing the two images read from the intermediate transfer-recording medium in the first inspecting step, with an image represented by the image data, thereby to determine whether the tow images have defects, in the case where at least one image is found to have no defects in the first inspecting step; an extra printing step of printing at lease two identical images, by using the image data, on another region of the intermediate transfer-recording medium, in the case where the two images are found to have defects in the second inspecting step; a third inspecting step of reading and comparing the two images printed on the intermediate transfer-recording medium in the extra printing step, thereby to determine whether the images have defects; a fourth inspecting step of comparing the two images read from the intermediate transfer-recording medium in the third inspecting step, with the image represented by the image data, in the case where at lease one image is found to have no defects in the third inspecting step, and then comparing the two images read from the intermediate transfer-recording medium in the first inspecting step, with the two images read from the intermediate transfer-recording medium in the third inspecting step, thereby to determine whether the two images read in the third inspecting step have detects; and a transferring step of transferring an image found to have no defects in the fourth inspecting step, from the intermediate transfer-recording medium to the final transfer-recording medium.

An image forming apparatus according to this invention comprises: printing means for printing at least two identical images on two regions of an intermediate transfer-recording medium, respectively, by using image data representing an image to be transferred to a final transfer-recording medium; inspecting means for inspecting the images printed on the intermediate transfer-recording medium by the printing means, by reading and comparing the images thereby to determine whether the images have defects; and transferring means for transferring an image found to have no defects by the inspecting means, from the intermediate transfer-recording medium to the final transfer-recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described, with reference to the accompanying drawings.

Figure 1:
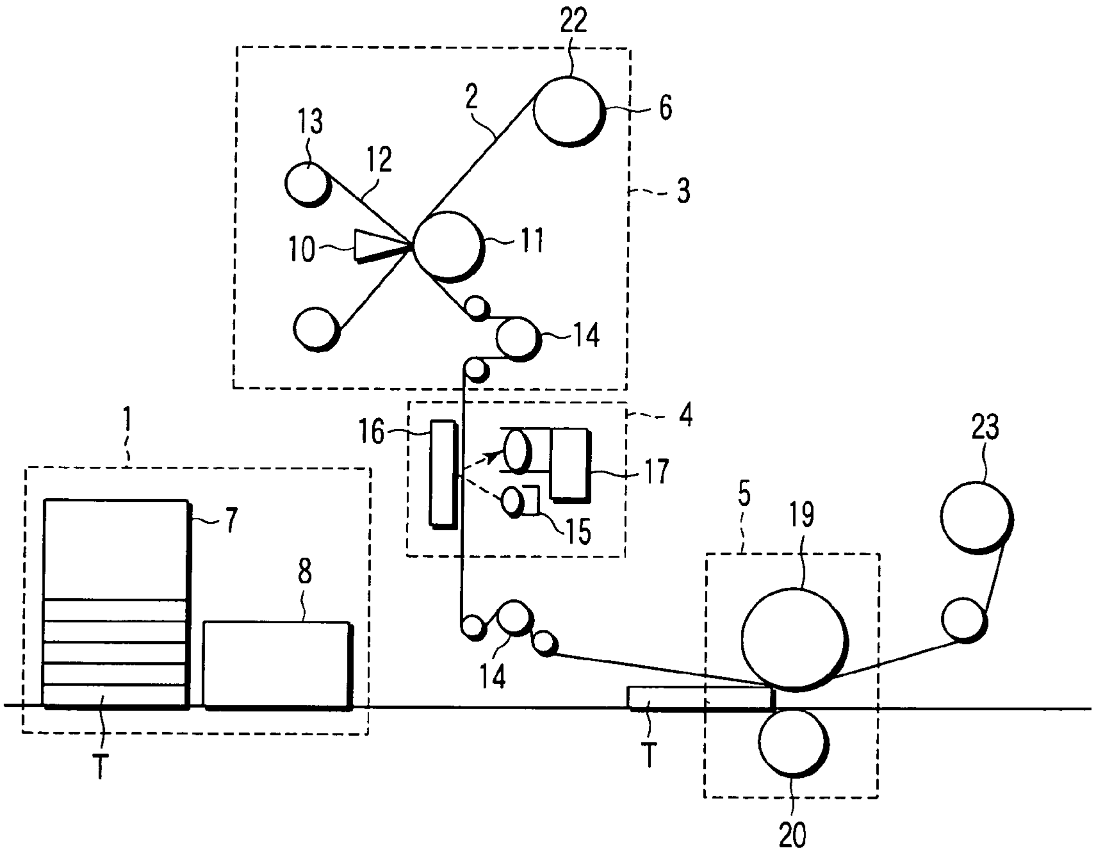
FIG. 1 is a diagram showing an image forming apparatus according to a first embodiment of the present invention.

The first embodiment will be described. FIG. 1 schematically shows an image forming apparatus according to the first embodiment. The image forming apparatus has a medium-feeding unit 1, a printing unit 3 (printing means), an inspection unit 4 (inspecting means), a transfer unit 5 (transferring means), and a medium-feeding unit 6. The medium-feeding unit 1 feeds recording media (final recording media) such as brochures T. The printing unit 3 prints images on an intermediate transfer-recording medium 2 that is a transparent or light-colored band. The inspection unit 4 inspects the images printed on the intermediate transfer-recording media 2 to determine whether the image is defective or not. The transfer unit 5 transfers an image from the intermediate transfer-recording media 2 to a brochure T. The medium-feeding unit 6 feeds the intermediate transfer-recording medium 2, guiding the medium 2 through the printing unit 3, inspection unit 4 and transfer unit 5.

The medium-feeding unit 1 comprises a hopper 7 and a page-turning mechanism 8. The hopper 7 holds a stack of brochures T. The brochures T are fed from the hopper 7, one by one, to the page-turning mechanism 8. The page-turning mechanism 8 turns the pages of the brochure T fed from the hopper 7.

The printing unit 3 comprises a thermal head 10, a platen roller 11, and a drive mechanism unit 13. The platen roller 11 is spaced from, and opposed to, the thermal head 10. The drive mechanism unit 13 runs an ink ribbon 12, through a gap between the thermal head 10 and the platen roller 11.

The inspection unit 4 comprises a light source 15, a reflector 16, and a CCD-type sensor 17. The light source 15 applies light to the intermediate transfer-recording medium 2. The reflector 16 reflects the light coming through the intermediate transfer-recording medium 2. The CCD-type sensor 17 receives the light reflected by the reflector 16. The light source 15 can emit light beams of different wavelengths, depending on the type of the ink contained in the ink ribbon 12. Assume that the ink contains, for example, ultraviolet-ray-excitable phosphor. Then, the light source 15 emits ultraviolet rays.

The transfer unit 5 comprises a heat roller 19 and a backup roller 20. The heat roller 19 presses a brochure T to the transfer-recording medium 2. The backup roller 20 supports the brochure T the heat roller 19 is pressing.

The medium-feeding unit 6, which feeds the intermediate transfer-recording medium 2, guiding the medium 2 through the printing unit 3, inspection unit 4 and transfer unit 5, comprises a feed roller 22, a take-up roller 23 and two medium-slackening mechanisms 14. The feed roller 22 feeds the intermediate transfer-recording medium 2. The take-up roller 23 takes up the medium 2. The medium-slackening mechanisms 14 are designed to slacken the intermediate transfer-recording medium 2 running from the feed roller 22 to the take-up roller 23.

Figure 2:
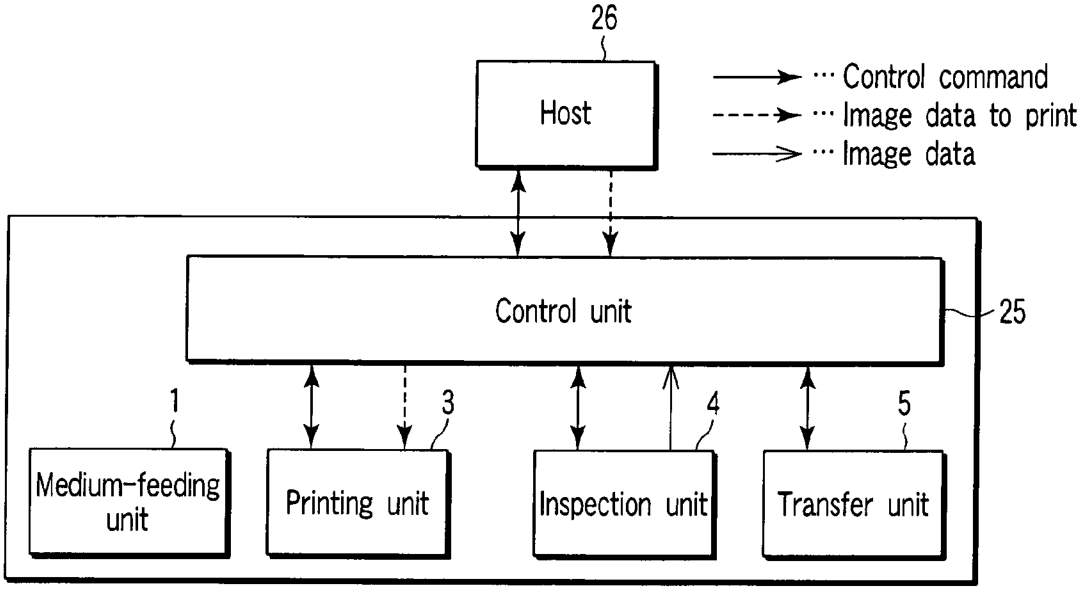
FIG. 2 is a block diagram showing the control system provided in the image forming apparatus of FIG. 1.

FIG. 2 is a block diagram of the control system provided in the image forming apparatus so configured as described above. As FIG. 2 shows, the printing unit 3, inspection unit 4 and transfer unit 5 are connected to a control unit 25 (control means), which in turn is connected to a host computer 26. Text data (e.g., personal data) and portrait data are transmitted from the host computer 26 to the printing unit 3 via the control unit 25. The printing unit 3 prints the images represented by the data items, on the intermediate transfer-recording medium 2. The inspection unit 4 inspects the images for any defects and generates data showing the results of inspection. This data is transmitted to the control unit 25. The control unit 25 controls the transfer unit 5 in accordance with the results of inspection.

Figure 3:
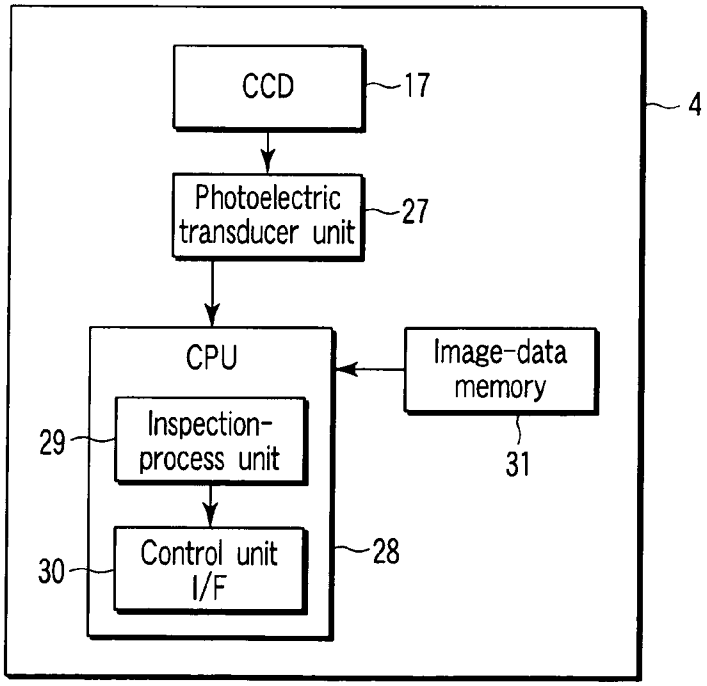
FIG. 3 is a block diagram showing the inspection unit shown in FIG. 2.

As FIG. 3 shows, the inspection unit 4 has a photoelectric transducer unit 27, a central processing unit (CPU) 28, and an image-data memory 31, in addition to the CCD-type sensor 17. The photoelectric transducer unit 27 is connected to the sensor 17. The CPU 28 has an inspection-process unit 29 and is connected to the control unit 25 by a control-unit interface (I/F) 30. The image-data memory 31 is connected to the CPU 28. The inspection-process unit 29 compares, for example, the reference image data stored in the memory 31 with the image data generated by the transducer unit 27 and representing, for example, a portrait. Thus, the unit 29 determines whether the image detected by the CCD-type sensor 17 is defective or not.

How the image forming apparatus so configured as described above operates will be explained.

Figure 4:
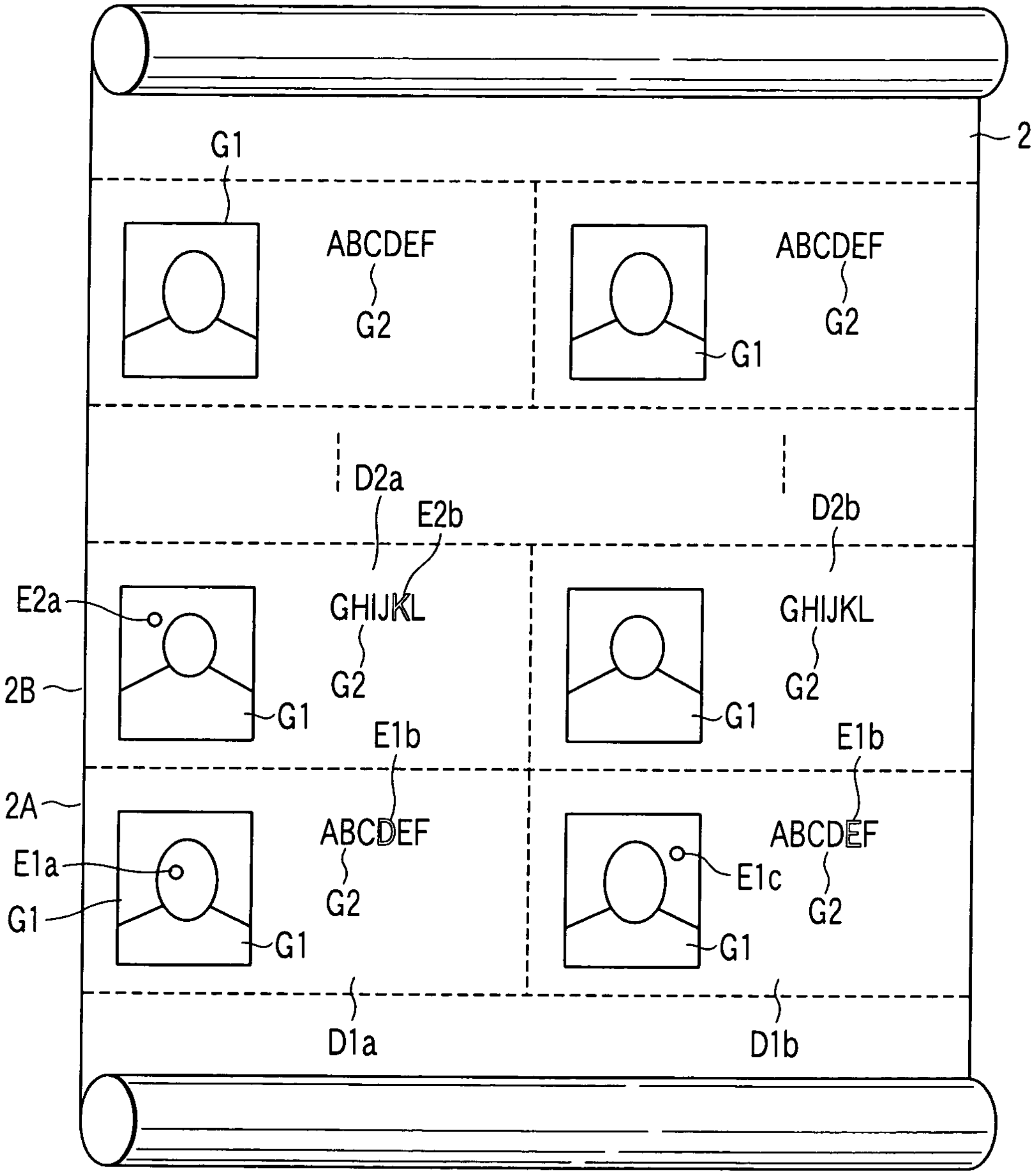
FIG. 4 is a schematic view of an intermediate transfer-recording medium on which an image is printed.

The host computer 26 transmits text data (e.g., personal data) and portrait data via the control unit 25 to the printing unit 3. In the printing unit 3, the thermal head 10 is heated in accordance with these data items. As shown in FIG. 4, ink is transferred from the ink ribbon 12 to the image-receiving layer in the first region 2A of the intermediate transfer-recording medium 2. As result, two images D1$a$ and D1$b$ that should be ideally identical, each consisting of portrait data G1 and text data G2, are printed side by side in the first region 2A of the intermediate transfer-recording medium 2.

In this embodiment, the identical images D1$a$ and D1$b$ are formed side by side as shown in FIG. 4. Instead, the images D1$a$ and D1$b$ may be arranged, one above the other in the lengthwise direction of the intermediate transfer-recording medium 2. In the embodiment, two identical images are formed in a region of the medium 2. Alternatively, three or more identical images may be formed in a region of the medium 2.

When the intermediate transfer-recording medium 2 runs, the two images D1$a$ and D1$b$ formed in the first region 2A of the medium 2 pass through the inspection unit 4. As the images D1$a$ and D1$b$ pass through the unit 4, one after the other, they are inspected for any defects. If images D1$a$ and D1$b$ have no defects, the transfer unit 5 transfers one of them (D1$a$ or D1$b$), designated beforehand, from the first region 2A to a designated page of a brochure T transported to the transfer unit 5 and opened at the designated page.

In synchronism with, or not in synchronism with, the image transfer to the brochure T, the next two images D2$a$ and D2$b$ (FIG. 4) are printed in the second region 2B of the intermediate transfer-recording medium 2. Needless to say, these images D2$a$ and D2$b$ are represented by the same image data.

The inspection unit 4 inspects these images D2$a$ and D2$b$ for any defects. The image D2$a$ may have defects E2$a$ and E2$b$ as shown in FIG. 4. In this case, the transfer unit 5 transfers the other image D2$b$, which has no defects, from the medium 2 to the designated page of the brochure T that has been transported to the transfer unit 5.

The two images D1$a$ and D1$b$ formed in the first region 2A may have defects E1$a$ and E1$b$ and defects E1$c$ and E1$d$, respectively, as shown in FIG. 4. In this case, the transfer unit 5 transfers neither the image D1$a$ nor the image D1$b$ to the brochure T set in the transfer unit 5, and first region 2A is taken up around the take-up roller 23. The first region 2A of the intermediate transfer-recording medium 2 is wasted indeed. Nevertheless, the brochure T remains in the transfer unit 5 to have any image transferred from the second region 2B or any region following the second region 2B. Hence, the brochure T is never discarded.

As exemplified above, the images D1$a$ and D1$b$ Assume printed in the second region 2A are defective. Therefore, the image data representing the original of these images (hereinafter called original image data) is transmitted from the host computer 26 via the control unit 25 to the printing unit 3. The printing unit 3 prints two identical images, each represented by the original image data, in the next region 2C of the intermediate transfer-recording medium 2. If at least one of these images has no defects, that at least one image will be transferred from the region 2C to a brochure T at the transfer unit 5.

A method of inspecting any image printed on the medium 2 for defects will be explained as follows.

Assume that the region 2A of the intermediate transfer-recording medium 2, for example, passes through the inspection unit 4. In the inspection unit 4, the light source 15 applies light to the back of the medium 2. The light passes through the medium 2 and reflected by the reflector 16. The sensor 17 receives the light thus reflected and converts the light into image data. The image data is supplied to the CPU 28.

The image data may represent a color image defined by red (R), green (G) and blue (B) pixels, each represented by eight bits. Otherwise, the image data may be 8-bit gray data that represents a monochrome image, such as a fluorescent image or characters. The inspection-process unit 29 incorporated in the CPU 28 examines such 8-bit image data, determining whether the image represented by the image data has defects or not.

More specifically, the inspection-process unit 29 compares the two images D1$a$ and D1$b$ printed on the first region 2A. If the images D1$a$ and D1$b$ are color images, the R, G and B pixels values of the image D1$a$ with the R, G and B pixels values of the image D1$b$. If the inspection-process unit 29 finds that the value difference between any pixel of the image D1$a$ and the corresponding pixel of the image D1$b$ exceeds a preset threshold, it will determine that one of the images thus compared has defects.

Image defects are, for example, dust existing on the medium 2, color-fading spots (including characters not printed) and stains. A method of detecting color-fading spots will be described. In most cases, a color image is formed of cyan-ink pixels, magenta-ink pixels and yellow-ink pixels. Suppose ink pixels of at least one color are not printed, a color-fading spot will develop. If a cyan-fading spot develops, its R-value will increase or its G and B values will decrease, because cyan, magenta and yellow are complementary to R, G and B, respectively.

Of the images D1$a$ and D1$b$ compared, one having a part with increased R-value (and with decreased G and B values) can be determined to have a color-fading spot. Whether an image has stains or defects resulting from dusts existing on the medium 2 can be determined in accordance with the difference between R, G and B pixels values of the image.

In the first embodiment described above, two identical images are printed on the intermediate transfer-recording medium 2 and are compared in units of pixels, thereby inspecting the images for any defects. Thus, each image can be examined, pixel by pixel. The first embodiment can therefore accomplish a high-precision inspection of images.

Second and third embodiments of the present invention will be described.

Figure 5:
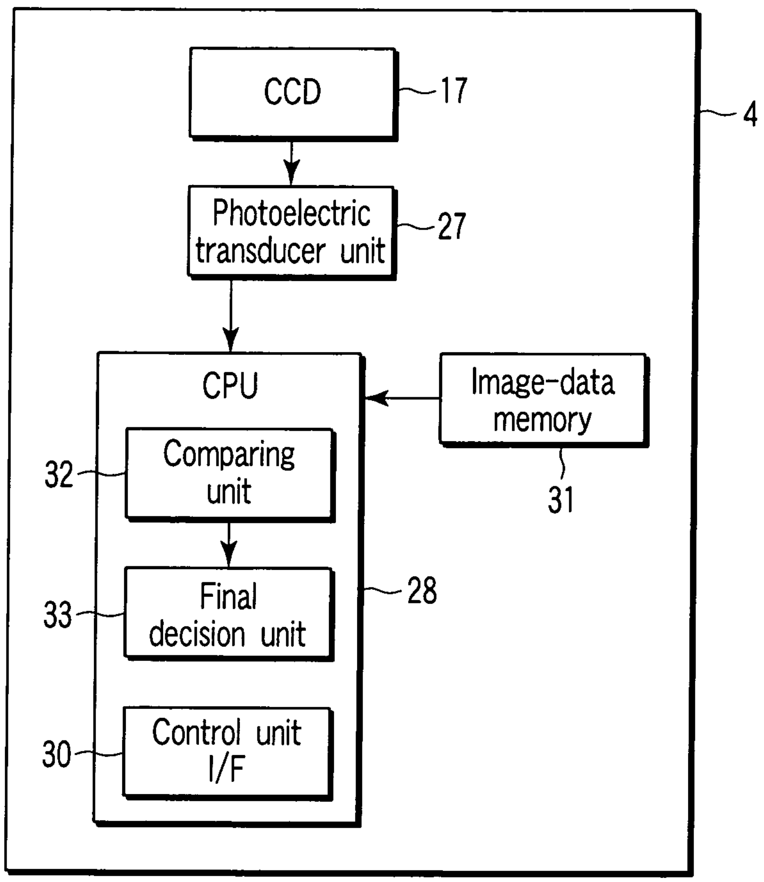
FIG. 5 is a block diagram showing the configuration of an inspection unit for use in image forming apparatuses according to second and third embodiments of the invention.

The second embodiment and the third embodiment differ from the first embodiment in that, as shown in FIG. 5, the inspection unit 4 has a comparing unit 32 and a final decision unit 33 (final decision means) in place of the inspection-process unit 29. In any other structural respects, they are identical to the first embodiment. Their components similar in function to those of the first embodiment will not be described in detail.

Figure 6:
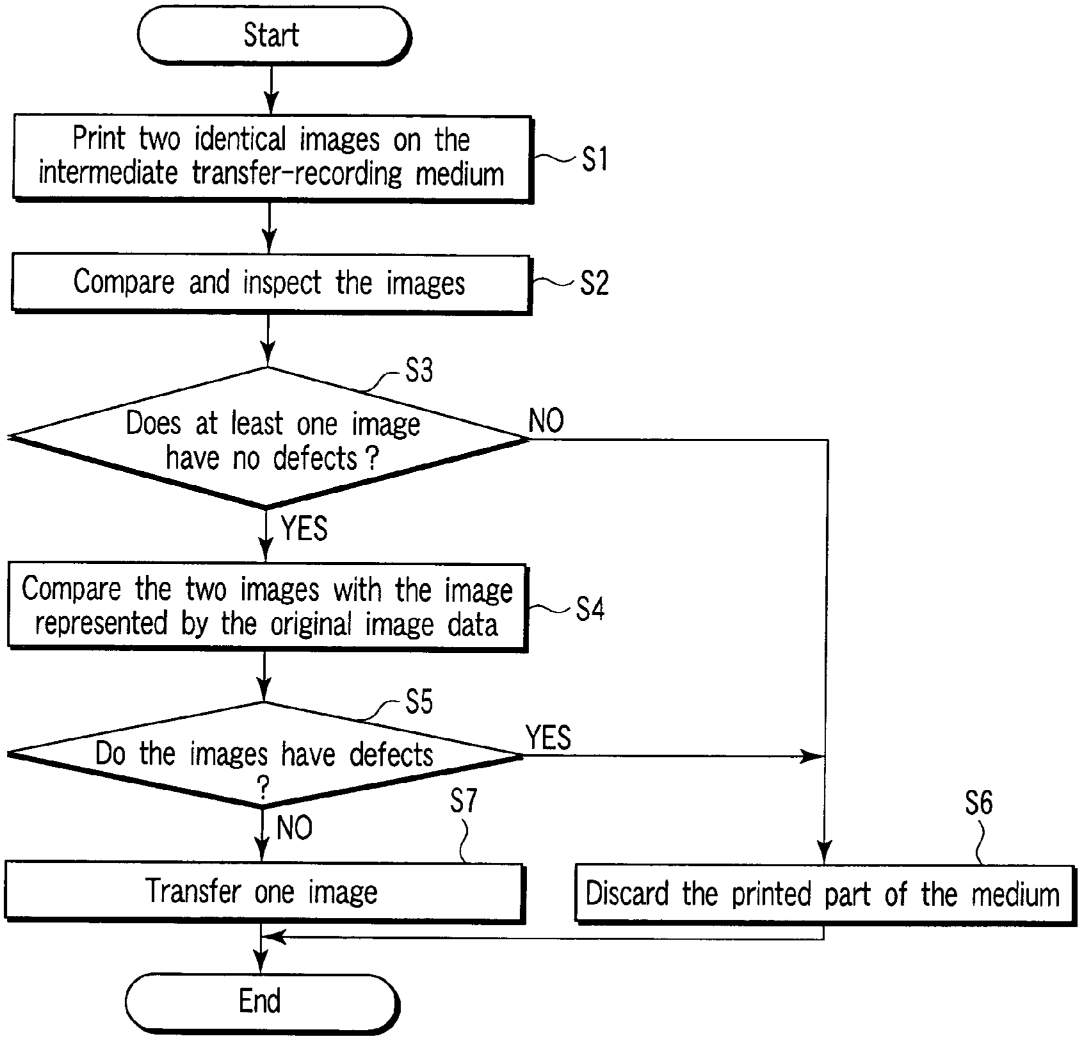
FIG. 6 is a flowchart explaining how the image forming apparatus according to the second embodiment operates.

The image forming apparatus according to the second embodiment operates as will be explained with reference to the flowchart of FIG. 6.

In the image forming apparatus according to the second embodiment, the printing unit 3 receives original image data and prints two identical images, each represented by the original image data, on the intermediate transfer-recording medium 2, in the same way as in the first embodiment (Step 1). The comparing unit 32 of the inspection unit 4 compares the two images thus printed, pixel by pixel, thereby determining whether the images have defects or not (Step 2).

Then, the comparing unit 32 determines whether at least one of the images has no defects (Step S3). Even if YES in Step S3, said at least one image is not transferred to a brochure T, but is inspected again to determine whether it has no defects at all.

More specifically, the final decision unit 33 compares the two images, pixel by pixel, with the image represented by the original image data (Step S4). Since the original image data represents an image at the same resolution as the two images, the unit 33 can compares the images with the image represented by the original image data, pixel by pixel.

The final decision unit 33 then determines whether the two images have defects (Step S5). If YES in Step S5, that part of the medium 2, on which the images are printed, is discarded (Step S6) even if YES in Step S3. If NO in Step S5, the image fund to have no defects in Step S3 is transferred to the brochure T (Step S7).

Both images inspected by the inspection unit 4 may be found to have defects (NO in Step S3). In this case, too, the that part of the medium 2, on which the images are printed, is discarded (Step S6), and the images are printed again on the intermediate transfer-recording medium 2, by using the original image data.

As described above, the two images printed on the intermediate transfer-recording medium 2 are compared with the image represented by the original image data, in the second embodiment. This can reduces the possibility of detecting moles and blemishes, if any on a portrait, as image defects. That is, moles may be detected as image defects, depending on their sizes. Thus, the inspection unit 4 may determine a portrait of a person having moles, as a defective image. This is why the final decision unit 33 compares the two images formed on the medium 2, with the original image data that represents distinguishing features such as moles and skin blemishes, even if the comparing unit 32 has found that they have no defects. Therefore, the final decision unit 33 can detect a portrait of a person having moles and/or blemishes, as a flawless image.

In the second embodiment, the two identical images printed on the intermediate transfer-recording medium 2 are compared, pixel by pixel, for any defects they may have, and they are further compared with the image represented by the original image data. This pixel-by-pixel inspection of images can reliably detect defects, if any, in the images inspected.

Figure 7:
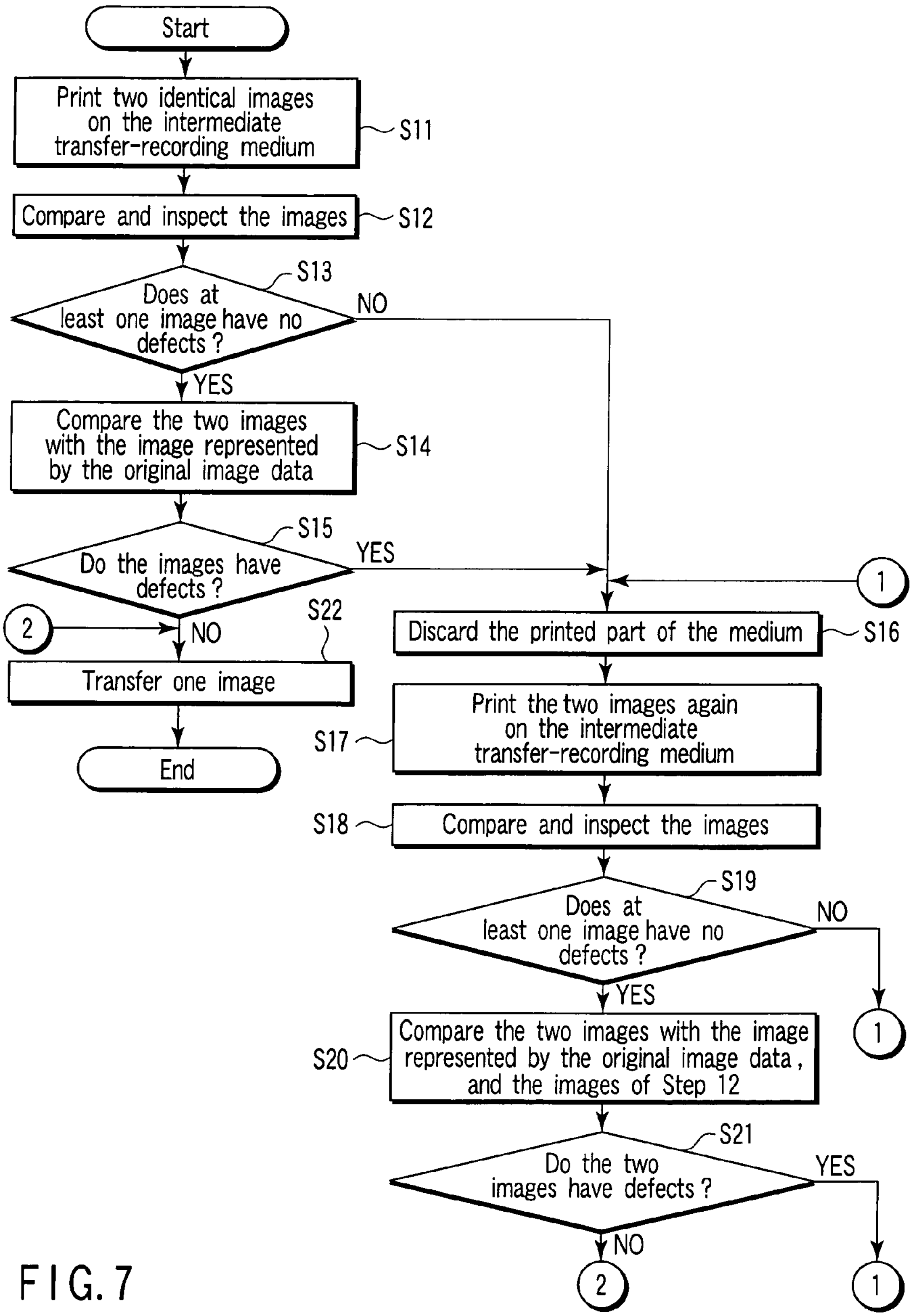
FIG. 7 is a flowchart explaining how the image forming apparatus according to the third embodiment operates.

The image forming apparatus according to the third embodiment operates as will be explained with reference to the flowchart of FIG. 7.

As in the first and second embodiments, the printing unit 3 receives original image data and prints two identical images, each represented by the original image data, on the intermediate transfer-recording medium 2 (Step 11). The comparing unit 32 of the inspection unit 4 compares the two images thus printed, pixel by pixel, thereby determining whether the images have defects or not (Step 12).

Then, the comparing unit 32 determines whether at least one of the images has no defects (Step S13). Even if YES in Step S13, said at least one image is not transferred to a brochure T, but is inspected again to determine whether it has no defects at all.

More specifically, the final decision unit 33 compares the two images, pixel by pixel, with the image represented by the original image data (Step S14). Since the original image data represents an image at the same resolution as the two images, the unit 33 can compares the images with the image represented by the original image data, pixel by pixel.

The final decision unit 33 then determines both images differ from the image represented by the original image data (Step S15). If YES in Step S15, that is, if both images have defects, that part of the medium 2, on which the images are printed, is discarded (Step S16) even if YES in Step S13.

Then, the printing unit 3 prints the two images again on another region of the intermediate transfer-recording medium 2 (Step S17).

Next, the inspection unit 4 reads the two images printed again on the medium 2 and compares these images (Step S18).

The inspection unit 4 then determines whether at least one of the images has no defects (Step S19). If YES in Step S19, the inspection unit 4 compares the two images with the image represented by the original image data, in the same way as in Step 14 (Step S20). Further, the inspection unit 4 compares the two images read from the medium 2 in Step S12, with the two images printed again on the medium 2, thereby determining whether they have no defects at all (Step S21).

If NO in Step S21, that is, if at least one of the two images printed again have no defects, the image found to have no defects in Step S19 is printed to a brochure T (Step S22).

If both image are found to have defects in Step S13, or if both images printed again have defects in Step S19, or if both images are found finally to have defects in Step S21, the operation goes to Step S16. In Step S16, that part of the medium 2, on which the images are printed, is discarded. Thereafter, two images represented by the original vide data are printed again on the intermediate transfer-recording medium 2. In Step S15, at least one of the two images may be found to have no defects. In this case, the operation goes to Step S22, in which the image having no defects is transferred to the brochure T.

In the third embodiment, if the two images printed first are found to defects, they are printed again, and the two images printed for the first time are compared with the two images printed for the second time. Hence, the possibility of detecting distinguishing features as image defects can be more reduced than in the case where the two images are compared with only the image represented by the original image data. Thus, moles and skin blemishes, if any, can be more correctly detected than in the second embodiment.

In most cases, the R, G and B pixels values of the original image data differ from the R, G and B pixels values of the image data generated in the inspection unit 4. This is because the original image data is generated by a device (e.g., camera or scanner) and represent images of additive primaries, whereas any printed image is composed of cyan, magenta and yellow ink dots that pertain to subtractive primaries. Therefore, the original image data can never be exactly the same as the image data generated in the inspection unit 4, in terms of R, G and B pixels values.

Hence, small distinguishing features, such as moles and skin blemishes, existing in the image represented by the original image data may not be detected by comparing the image read from the medium 2 with only the image represented by the original image data. Nonetheless, the distinguishing features can be determined as such, not as image defects, if they are detected not only at the first inspection, but also at the first inspection.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An image forming method comprising:

a printing step of printing two images of same size on an intermediate transfer-recording medium, by using single image data representing an image to be transferred to a final transfer-recording medium, the two images of same size comprising identical image content;

an inspecting step of inspecting the two images of same size printed on the intermediate transfer-recording medium after the printing step, by reading and comparing the two images of same size, to determine whether the images have defects; and a transferring step of transferring an image found to have no defects in the inspecting step, from the intermediate transfer-recording medium to the final transfer-recording medium, wherein, when the two images of same size are found to have no defects during the inspecting step, transferring either of the two images of same size from the intermediate transfer-recording medium to the final transfer-recording medium.

2. The method according to claim 1, further comprising an extra printing step of printing the two images of same size, by using the single image data, on another region of the intermediate transfer-recording medium in the case where the two images of same size are found to have defects in the inspecting step.

3. The method according to claim 1, further comprising a re-inspecting step of comparing the two images of same size read in the inspecting step with an image represented by the single image data, to determine whether the two images of same size have defects, in the case where at least one of the images is found to have no defects in the inspecting step, and in which an image found to have no defects in the re-inspecting step is transferred from the intermediate transfer-recording medium to the final transfer-recording medium.

4. The method according to claim 3, wherein in the transferring step, said at least one image found to have no defects in the inspecting step is transferred from the intermediate transfer-recording medium to the final transfer-recording medium in the case where the two images of same size are found to have no defects in the re-inspecting step.

5. The method according to claim 3, further comprising an extra printing step of printing two images of same size, by using the single image data, on another region of the intermediate transfer-recording medium, in the case where the two images of same size are found to have defects in the re-inspecting step.

6. An image forming method comprising:

a printing step of printing two images of same size on an intermediate transfer-recording medium, by using single image data representing an image to be transferred to a final transfer-recording medium, the two images of same size comprising identical image content;

a first inspecting step of inspecting the two images of same size printed on the intermediate transfer-recording medium in the printing step, by reading the two images of same size from the intermediate transfer-recording medium and comparing the two images of same size to determine whether the images have defects;

a second inspecting step of comparing the two images of same size to determine whether the images have defects, by comparing the two images of same size read from the intermediate transfer-recording medium in the first inspecting step, with an image represented by the image data, thereby to determine whether the two images of same size have defects, in the case where at least one image is found to have no defects in the first inspecting step;

an extra printing step of printing two images of same size, by using the image data, on another region of the intermediate transfer-recording medium, in the case where the two images of same size are found to have defects in the second inspecting step;

a third inspecting step of reading and comparing the two images of same size printed on the intermediate transfer-recording medium in the extra printing step, thereby to determine whether the images have defects;

a fourth inspecting step of comparing the two images of same size read from the intermediate transfer-recording medium in the third inspecting step, with the image represented by the image data, in the case where at lease one image is found to have no defects in the third inspecting step, and then comparing the two images of same size read from the intermediate transfer-recording medium in the first inspecting step, with the two images of same size read from the intermediate transfer-recording medium in the third inspecting step, thereby to determine whether the two images of same size read in the third inspecting step have defects; and a transferring step of transferring an image found to have no defects in the fourth inspecting step, from the intermediate transfer-recording medium to the final transfer-recording medium.

7. The method according to claim 6, wherein in the transferring step, either one of the two images of same size is transferred from the intermediate transfer-recording medium to the final transfer-recording medium in the case where the two images of same size are found to have no defects in the fourth inspecting step.

8. An image forming apparatus comprising:

printing means for printing two images of same size on an intermediate transfer-recording medium, by using single image data representing an image to be transferred to a final transfer-recording medium;

inspecting means for inspecting the two images of same size printed on the intermediate transfer-recording medium by the printing means, by reading and comparing the two images of same size to determine whether the images have defects; and transferring means for transferring an image found to have no defects by the inspecting means, from the intermediate transfer-recording medium to the final transfer-recording medium, wherein, when the inspecting means determines that the two images of same size have no defects, the transferring means transfers either one of the two I images of same size from the intermediate transfer-recording medium to the final transfer-recording medium.

9. The apparatus according to claim 8, further comprising a controller which causes the printing means to print the at least two images of same size, by using the single image data, on another region of the intermediate transfer-recording medium, in the case where the inspecting means determines that the two I images of same size have defects.

10. The apparatus according to claim 8, which further comprises re-inspecting means for comparing the two images of same size read by the inspecting means, with an image represented by the single image data, thereby to determine whether at least one image has defects, in the case where the inspecting means determines that at least one image has no defects, and in which the transferring means transfers an image found to have no defects from the intermediate transfer-recording medium to the final transfer-recording medium.

11. The apparatus according to claim 10, wherein the transferring means transfers one of the two images of same size which are found to have no defects in the inspecting means, from the intermediate transfer-recording medium to the final transfer-recording medium, in the case where the re-inspecting determines that the two images of same size have no defects.

12. The apparatus according to claim 10, further comprising a controller which causes the printing means to print at least two images of same size, by using the single image data, on another region of the intermediate transfer-recording medium, in the case where the re-inspecting means determines that the two images of same size have defects.

* * * * *